United States Patent [19]

Quartermaine et al.

[11] Patent Number: 5,332,768
[45] Date of Patent: Jul. 26, 1994

[54] METHOD OF REDUCING THE CONCENTRATION OF A LIQUID RESIN IN AN AQUEOUS COMPOSITION

[75] Inventors: Roy E. Quartermaine, Wadenswil, Switzerland; Yvonne M. Goerlach-Doht, Hamburg, Fed. Rep. of Germany

[73] Assignee: The Dow Chemical Company, Midland, Mich.

[21] Appl. No.: 13,602

[22] Filed: Feb. 4, 1993

[30] Foreign Application Priority Data

Mar. 3, 1992 [GB] United Kingdom ............. 9204600.2

[51] Int. Cl.$^5$ .......................... C08K 3/20; C08L 63/02
[52] U.S. Cl. ...................................... 523/402; 523/403
[58] Field of Search ................................. 523/402, 403

[56] References Cited

U.S. PATENT DOCUMENTS 2,865,854 12/1958 Sweet .
3,221,032 11/1965 Price et al. .
4,582,892 4/1986 Chang et al. .

FOREIGN PATENT DOCUMENTS 0187364 7/1986 European Pat. Off. .
57-42755 3/1982 Japan .
57-68190 4/1982 Japan .
59-156483 5/1984 Japan .
353695 4/1961 Switzerland .
874660 10/1981 U.S.S.R. .
723868 2/1955 United Kingdom .
869500 5/1961 United Kingdom .
1417275 10/1975 United Kingdom .
1466292 3/1977 United Kingdom .
1475328 6/1977 United Kingdom .

OTHER PUBLICATIONS

Patent Abstracts of Japan, vol. 9, No. 1 (C-259) (1724), Jan. 5, 1985, Abstracting JP-A-59,156,483.

*Primary Examiner*—Melvyn I. Marquis
*Assistant Examiner*—D. Aylward

[57] ABSTRACT

The concentration of an emulsified liquid resin in an aqueous composition which contains the resin and at least one ionic compound is reduced. The reduction is carried out by mixing a solution of a non-ionic cellulose ether in a liquid diluent with the aqueous composition. An agglomerate of cellulose ether and liquid resin is formed and the agglomerate can be separated.

20 Claims, No Drawings

METHOD OF REDUCING THE CONCENTRATION OF A LIQUID RESIN IN AN AQUEOUS COMPOSITION

BACKGROUND OF THE INVENTION

The present invention relates to a method of reducing the concentration of a liquid resin in an aqueous composition which contains an emulsified liquid resin and at least one ionic compound.

Liquid resins are well known and useful for a wide variety of applications, for example in the coating and paint industries, electrical and structural applications, as well as for producing adhesives. Exemplary of liquid resins, which are manufactured, i.e. synthetic, are liquid epoxy, phenolic and polycarbonate resins, poly(vinyl alcohol), polyacrylamides and poly(acrylic acid) and derivatives.

According to many known processes synthetic liquid resins are produced in an aqueous system. Wastewater from such production processes often contains residual amounts of emulsified liquid resin. Frequently the wastewater also contains one or more types of ionic compounds which are used during the production process or which are produced as a by-product in the production process. Due to the increasing awareness of environmental problems caused by emulsified liquid resins in wastewater streams and due to increasingly stringent environmental regulations much research effort has been spent in reducing the concentration of emulsified liquid resins in aqueous compositions, such as wastewater, originating from a process for producing the liquid resin. Generally, applied methods of treating wastewater are standard flocculation, biodegradation methods etc. However, many liquid resins, such as epoxy resins, are poorly biodegradable.

An abstract of published Japanese patent application JP-A-59156483 suggests the treatment of an effluent containing polymerizable organic matters, such as monomers or oligomers of epoxy resin, polyester or acrylic ester, by selective adsorption on cellulose-type powder. The effluent to be treated is passed through a layer of cellulose-type powder, e.g. saw dust, pulp insoluble in water, paper and waste coconut seed fibers etc. The polymerizable organic matter is adsorbed by the cellulose-type powder and the powder and the organic matters contained therein are removed from the effluent and incinerated. Prior to contacting with the cellulose-type powder, the effluent is preferably heated to accelerate polymerization reaction of the polymerizable organic matters contained in the effluent. However, this method requires the incineration of large amounts of moist cellulose-type material on which the organic matters have been adsorbed.

Accordingly, it would be desirable to find another method of reducing the concentration of a liquid resin in an aqueous composition which contains an emulsified liquid resin and an ionic compound or ionic compounds.

It has now been found that the concentration of a liquid resin in such an aqueous composition can be reduced by contacting the aqueous composition with a solution of a non-ionic cellulose ether in a liquid diluent to produce an agglomerate of cellulose ether and liquid resin. The agglomerate can be removed from the mixture of aqueous composition and cellulose ether solution.

SUMMARY OF THE INVENTION

Accordingly, the present invention relates to a method of reducing the concentration of a liquid resin in an aqueous composition containing an emulsified liquid resin and at least one ionic compound, which method comprises contacting the aqueous composition with a solution of a non-ionic cellulose ether in a liquid diluent to produce an agglomerate of cellulose ether and liquid resin.

DETAILED DESCRIPTION OF THE INVENTION

By "liquid resin" is meant a resin which is liquid at ambient pressure and ambient or slightly elevated temperature, i.e. up to 50° C.

The method of the present invention is useful for a great variety of liquid resins, such as liquid epoxy resins, polyester resins, acrylic ester resins, polycarbonate resins, urethane resins or phenolic resins, when small droplets of the resin are emulsified in an aqueous composition containing at least one ionic compound and when it is desired to remove at least a portion of the small resin droplets from the aqueous composition, e.g. for process purification or effluent treatment.

As will be discussed further below, the contact of cellulose ethers with solid polymers for various purposes has been suggested by several skilled artisans. However, it has never been suggested to use a solution of a non-ionic cellulose ether in a liquid diluent for removing small droplets of emulsified liquid resin from an aqueous composition. It is very surprising that generally more than 80%, typically more than 90% and in many cases even more than 95% of the liquid resin originally present in an aqueous composition can be removed, even if the initial concentration of the liquid resin is only from 10 to 8,000 ppm, preferably from 20 to 2,000 ppm, more preferably from 50 to 1,000 ppm, based on the total weight of the aqueous composition.

Some prior art references suggest the use of cellulose ethers for isolating solid polymers or other materials from aqueous dispersions.

British patent specifications 1,417,275 and 1,475,328 both relate to the isolation of solid rubbers from aqueous dispersions containing from 10 to 60% of the solid rubber, based on the total weight of the dispersion. According to British patent specification 1,417,275 cellulose is added to the aqueous dispersion in an amount of from 0.1 to 15%, preferably from 2 to 10%, by the total weight of the rubber. According to British patent specification 1,475,328 an alkyl cellulose or a hydroxyalkyl cellulose is added to the aqueous dispersion in an amount of from 0.1 to 10%, preferably from 0.1 to 5%, by the total weight of the rubber and a water-soluble alkali metal salt, alkaline earth metal salt, aluminum salt or zinc salt is also added, preferably at an amount of from 0.02 to 10%, by the total weight of the rubber.

British patent specification 723,868 relates to methods of removing dispersed materials from dispersions. According to one method an anionic disperse phase is precipitated with a water-soluble cationic polymer, such as a quaternary ammonium salt. According to another method a cationic disperse phase is precipitated with a water-soluble anionic polymer, such as meth)acrylic acid polymers.

Swiss patent 353,695 relates to the purification of muddy water by means of flocculating the dirt and removing the resulting flocks by sieving. A cellulose ether or cellulose ester is used in combination with a flocculating agent in order to increase the size of the flocks.

Other prior art references suggest the use of cellulose compounds as suspending agents in aqueous dispersions of solid polymers.

British patent specification 1,466,292 discloses a process for preparing aqueous dispersions of solid water-insoluble epoxy resins. In a high shear mixing device two streams are mixed. The first stream contains water and a dispersing agent which is a synthetic gum of cellulose origin, such as hydroxypropyl methyl cellulose gum, a hydroxyalkyl guar gum or a polyvinyl alcohol containing unhydrolyzed acetate groups. The second stream contains a water insoluble epoxy resin dissolved in an organic solvent which will form a single phase with water. The solvent is separated from the mixed streams whereby an aqueous dispersion of a solid water-insoluble epoxy resin is formed. The produced dispersion contains from 2 to 75%, most preferably from 15 to 60% of the solid epoxy resin and from 1 to 10 parts by weight per 100 parts by weight of epoxy resin of the non-ionic dispersing agent. In the process disclosed by British patent specification 1,466,292 cellulose gum is only used as a dispersing agent for a solid epoxy resin.

The published European patent application 0,187,364 discloses the use of a cosuspending aid system for controlling particle size and porosity in an aqueous suspension polymerization of ethylenically unsaturated monomers and comonomers, such as vinyl chloride. The cosuspending aid system contains a water-soluble cellulose ether and a substantially water-insoluble, organic-soluble cellulose ether.

British patent specification 869,500 suggests to add a small amount of ethyl hydroxyethyl cellulose to a synthetic rubber latex containing unreacted polymerizable monomeric material before removing unreacted monomers. The addition of ethyl hydroxyethyl cellulose results in a latex having greatly increased particle size. The produced latex has a solids content of 20 to 50% and may be concentrated to a solids content of 55 to 70%.

Contacting cellulose ethers with a polymeric compound is also suggested for various other purposes.

U.S. Pat. No. 2,865,854 relates to a method of reducing the biological oxygen demand (BOD) of starch-containing effluents from plants of the textile or papermaking industry. The BOD of water contaminated with starch is decreased by adding an alkyl cellulose ether, a carboxyalkyl cellulose ether, a hydroxyalkyl cellulose ether or a mixed cellulose ether.

The patent abstracts of Japan, vol. 6, no 114 (C-110)(992) Jun. 25, 1982, abstracting JP-A-57 42 755 suggests blending 10 to 80 wt. parts of methyl cellulose or hydroxypropyl methyl cellulose with 100 wt. parts vinyl chloride resin to produce a vinyl chloride resin composition exhibiting good adhesion.

The method of the present invention is particularly useful for liquid epoxy resins. One preferred embodiment of the invention is a method wherein the concentration of epoxy resin is reduced in wastewater originating from a process for producing liquid epoxy resin. Accordingly, the method of the present invention is described in the following paragraphs mainly with reference to liquid epoxy resins. However it should be noted that the method is not limited to reducing the concentration of epoxy-type liquid resins in aqueous compositions.

Liquid epoxy resins are usually prepared by reacting a polyhydric phenol, such as a bisphenol, and an epihalohydrin in the presence of a caustic catalyst, such as aqueous sodium hydroxide, or in the presence of an quaternary ammonium catalyst, such as benzyl trimethyl ammonium chloride. The produced intermediate is converted to a glycidyl polyether by dehydrohalogenation in an organic reaction diluent or in an organic reactant, such as epihalohydrin, by means of an alkaline material, such as aqueous sodium hydroxide. The preparation of liquid epoxy resins is well known, for example from U.S. Pat. Nos. 3,221,032 and 4,582,892. The liquid epoxy resin (glycidyl polyether) in the organic reaction diluent or organic reactant is separated from the aqueous phase and is processed further. The aqueous phase is wastewater which requires purification before it is released to the environment. The aqueous phase contains small amounts of emulsified liquid epoxy resin and at least one ionic compound. Several types of ionic compounds can be present in the wastewater, such as sodium chloride, sodium hydroxide and sodium carbonate.

The method of the present invention is useful for a wide variety of liquid epoxy resins. Suitable examples of liquid resins include liquid epoxy resins from the reaction of polyphenols and epihalohydrins, polyalcohols and epihalohydrins, amines and epihalohydrins, sulfur-containing compounds and epihalohydrins, polycarboxylic acids and epihalohydrins, polyisocyanates and 2,3-epoxy-1-propanol (glycide) and from epoxidation of olefinically unsaturated compounds. Preferred epoxy resins are the reaction products of polyphenols and epihalohydrins, or polyalcohols and epihalohydrins or of polycarboxylic acids and epihalohydrins. Mixtures of polyphenols, polyalcohols, amines, sulfur-containing compounds, polycarboxylic acids and/or polyisocyanates can also be reacted with epihalohydrins.

Illustrative examples of liquid epoxy resins useful herein are described in The Handbook of Epoxy Resins by H. Lee and K. Neville, published in 1967 by McGraw-Hill, New York, in appendix 4-1, ppgs through 4-56 and U.S. Pat. Nos. 2,633,458; 3,477,990; 3,821,243; 3,970,719; 3,975,397; 4,071,477; and 4,582,892, and GB Patent Specification No. 1,597,610, all of which are incorporated herein by reference.

Of particular interest is the production of epoxy resins, including diglycidyl ethers of bisphenol compounds, particularly those compounds represented by the following structure I:

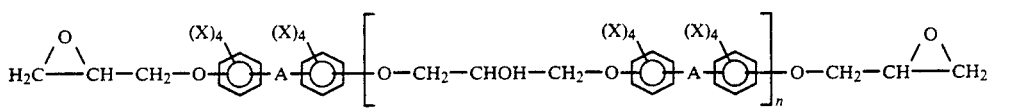

wherein each A is independently a divalent hydrocarbon group having from 1 to 8 carbon atoms, preferably methylene or, more preferably, isopropylidene ($-C(CH_3)_2-$), $-C(O)-$, $-O-$, $-S-$, $-S-S-$, $-S(O)-$, $-S(O)_2-$ or a covalent bond; each X is independently hydrogen, an alkyl group of 1 to 6 carbon atoms such as methyl, ethyl, propyl, butyl, pentyl or hexyl, or halogen, preferably chlorine or bromine; and n has an average value of from 0 to 8, preferably from 0 to 6, most preferably from 0 to 2.

The average epoxy equivalent weight is advantageously from 149 to 1300, preferably from 149 to 1000, most preferably from 200 to 800.

The average epoxy equivalent weight (EEW) is the average molecular weight of the resin divided by the number of epoxy groups per molecule. The molecular weight is a weight average molecular weight.

Particularly preferred epoxy resins are those wherein each A is methylene or isopropylidene, each X is independently hydrogen or bromine and n is on the average from 0 to 2. Preferred examples of these resins are bisphenol A type epoxy resins having an average epoxy equivalent weight of from about 170 to about 200. Such resins are commercially available from The Dow Chemical Company, as D.E.R. 330, D.E.R. 331 and D.E.R. 332 epoxy resin.

Other polyhydric phenols which may be co-reacted with an epihalohydrin to provide these epoxy polyethers are such compounds as resorcinol, hydroquinone and substituted hydroquinones, e.g. methylhydroquinone.

Further useful liquid epoxy resins are those obtained from the reaction of polyhydric alcohols with epihalohydrins. These alcohols can be polyether polyols or polyester polyols. Preferred epoxy resins are as represented by the structure:

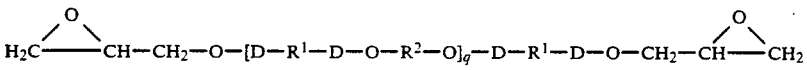 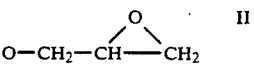

wherein each D is independently C=O or a covalent bond; $R^1$ and $R^2$ have the same or different meanings and each $R^1$ and $R^2$ are independently a branched or unbranched $C_{1-12}$ alkylene group, preferably a $C_{1-6}$ alkylene group, optionally substituted by hydroxy, $C_{1-6}$ alkoxy or halogen, preferably chlorine or bromine; and q is an average number from 0 to 30, preferably from 0 to 15, more preferably from 0 to 8, provided that they are liquid.

The most preferred examples of the epoxy resins of structure II are those wherein (a) each D is C=O, $R^1$ is an unbranched $C_{3-6}$ alkylene group, preferably a $C_4$ alkylene group and $R^2$ is a $C_{2-4}$ alkylene group, preferably ethylene or (b) each D is a covalent bond and $R^1$ and $R^2$ are the same or different and have the meaning of ethylene, isopropylene or 1-methyl-propylene and q has the above-mentioned value.

Another useful class of polymeric resins includes liquid epoxy novolac resins. The epoxy novolac resins can be obtained by reacting, preferably in the presence of a basic catalyst, e.g. sodium or potassium hydroxide, an epihalohydrin, such as epichlorohydrin, with the resinous condensate of an aldehyde, e.g. formaldehyde, and either a monohydric phenol, e.g. phenol itself, or a polyhydric phenol. Further details concerning the nature and preparation of these epoxy novolac resins can be obtained in Lee, H. and Neville, K., Handbook of Epoxy Resins, McGraw Hill Book Co. New York, 1967, whose teaching is included herein by reference. Preferred epoxy novolac resins are represented by the structure:

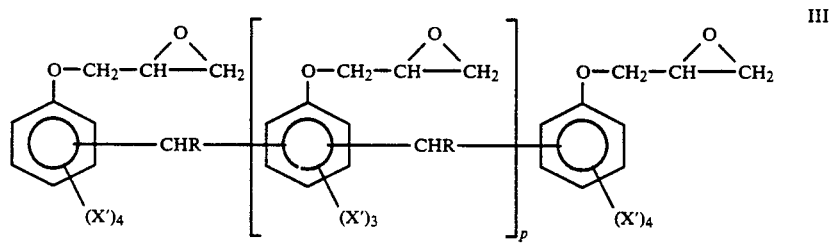

wherein each R is independently hydrogen or an alkyl group having from 1 to 4 carbon atoms, such as methyl, ethyl, n-propyl, i-propyl, or butyl, each X' is independently hydrogen, halogen, preferably chlorine or bromine, $C_{1-8}$ alkyl, preferably $C_{1-4}$ alkyl, or hydroxyl; and p has an average value of 0 to 6, preferably 0 to 3, most preferably 0 to 1, provided that they are liquid.

The epoxy novolac resins preferably have an average epoxy equivalent weight of from 160 to 500, preferably from 160 to 300, most preferably from 170 to 250.

Useful liquid epoxy novolac resins include those having an average value of p of 0.2 to 2.1. Liquid epoxy novolac resins having values of p of 0.2, 1.7 and 2.1 are commercially available from The Dow Chemical Company as D.E.N. 431, D.E.N. 438 and D.E.N. 439 resins, respectively.

It is to be understood and generally known in the art that the above indicated epoxy resins are usually produced and sold as mixtures of resins having different molecular weights. Resins which have a molecular weight distribution have a lower melting point than pure resins having a single molecular weight.

The method of the present invention is particularly useful for aqueous compositions which contain from 10 to 8,000 ppm, preferably from 20 to 2,000 ppm, more preferably from 50 to 1,000 ppm of the liquid resin, based on the total weight of the aqueous composition.

By aqueous composition is meant that the majority of the liquid consists of water molecules. Furthermore, the aqueous composition may contain organic compounds which originate from the process of producing the liquid resin. In the case of liquid epoxy resins such compounds are for example halohydrins, glycidol, glycerine, epihalohydrin, etc. The aqueous composition usually contains less than 20 wt.-%, preferably less than 10 wt.-%, more preferably less than 5 wt.-% of such inert organic solvents if they are present at all. The weight percentages are based on the total weight of the aqueous composition.

Further, the aqueous composition contains at least one, typically more than one type of ionic compound or electrolyte. The term "an ionic compound" as used herein includes a multiple of different ionic compounds. Typically the ionic compounds which are contained in the aqueous composition originate from a process for producing the liquid resin. The presence of one or more types of ionic compounds or electrolytes in the aqueous composition facilitates the precipitation of the non-ionic cellulose ether and the formation of agglomerates between the liquid resin and the cellulose ether. The optimal concentration of the ionic compound in the aqueous composition depends on various factors, such as the type and amount of liquid resin, the type and amount of non-ionic cellulose ether and the type of ionic compound in the aqueous composition. Preferably, the total concentration of all ionic compounds in the aqueous composition is close to the saturation level of the mixture of all ionic compounds present. Generally the aqueous composition contains the inorganic compound or compounds at an amount of at least 50%, preferably at least 80%, more preferably at least 90% and most preferably at least 95%, based on the saturation concentration of the total of all ionic compounds which are present in the aqueous composition.

Preferred cations in the aqueous composition are alkali metal or alkaline earth metal ions, such as sodium, potassium, magnesium or calcium ions, as well as aluminum, iron and ammonium ions, such as tetramethylammonium or tetrabutylammonium. Preferred anions in the aqueous composition are halogen ions, such as chloride or bromide, oxygen containing anions, such as the acetate, hydroxide, carbonate anions, $HSO_4^-$ or $SO_4^{2-}$. Preferred ionic compounds are sodium chloride, potassium chloride, sodium carbonate, potassium carbonate, sodium hydroxide and potassium hydroxide. The most preferred ionic compounds are sodium chloride, sodium carbonate and sodium hydroxide. Such ionic compounds are often contained in wastewater streams originating from the production of liquid resins, such as liquid epoxy resins. The sodium chloride concentration in the aqueous composition preferably is from 0 to 26%, more preferably from 5 to 21% and most preferably from 12 to 20%, based on the total weight of the aqueous composition. The sodium carbonate concentration preferably is from 3 to 15%, more preferably from 4 to 10% and most preferably from 5 to 7%, based on the total weight of the aqueous composition. The sodium hydroxide concentration preferably is up to 5%, more preferably up to 2% and most preferably up to 1%, based on the total weight of the aqueous composition.

Optionally, the aqueous composition contains further components, such as partially or fully hydrolyzed products resulting from the hydrolysis of the epihalohydrin when used in the production process as well as any water soluble catalyst which may have been used in production.

A solution of a non-ionic cellulose ether in a liquid diluent is mixed with the aqueous composition. Useful non-ionic cellulose ethers are for example $C_{1-2}$-alkyl cellulose ethers, such as methyl cellulose ethers, ethyl cellulose ethers, or hydroxy-$C_{2-4}$-alkyl $C_{1-2}$-alkyl cellulose ethers, such as hydroxypropyl methyl cellulose ethers, hydroxypropyl ethyl cellulose ethers, hydroxybutyl methyl cellulose ethers, hydroxyethyl methyl cellulose ethers or hydroxyethyl ethyl cellulose ethers. Methyl cellulose ethers and hydroxypropyl methyl cellulose ethers are preferred.

Useful methyl cellulose ethers generally have a methoxyl substitution of at least 24, preferably at least 26 and most preferably at least 27 percent and up to 37, preferably up to 35 and most preferably up to 33 percent. The methoxyl substitution is measured and calculated according to ASTM D 3876. All the percentages of substitution are by weight of the finally substituted material. The methyl cellulose ether preferably has a weight average molecular weight of from 500 to 2,000,000, more preferably from 800 to 1,500,000, most preferably from 20,000 to 1,500,000. The weight average molecular weight ($M_w$) can be determined by gel permeation chromatography.

Useful hydroxypropyl methyl cellulose ethers have a methoxyl substitution of at least 10, preferably at least 15 and most preferably at least 19 percent and up to 37, preferably up to 35 and most preferably up to 30 percent and a hydroxypropyl substitution of at least 0.3, preferably at least 1 and most preferably at least 4 percent and up to 37, preferably up to 32 and most preferably up to 25 percent. The methoxyl and hydroxypropyl substitutions are measured and calculated according to ASTM-D 1347-72 and ASTM D 2363-72, respectively. All the percentages of substitution are by weight of the finally substituted material. The hydroxypropyl methyl cellulose ether preferably has a weight average molecular weight of from 500 to 2,000,000, more preferably from 800 to 1,500,000, most preferably from 20,000 to 1,500,000. The weight average molecular weight ($M_w$) can be determined by gel permeation chromatography.

Useful solutions may also contain mixtures of different non-ionic cellulose ethers, such as mixtures of different methyl cellulose ethers or different hydroxypropyl methyl cellulose ethers or mixtures of methyl cellulose and hydroxypropyl methyl cellulose ethers. Non-ionic cellulose ethers, such as methyl cellulose and hydroxypropyl methyl cellulose ethers are well known in the art and may be prepared by known methods, for example as described in U.S. Pat. Nos. 2,831,852; 2,949,452; 3,388,082; 4,410,693 and 4,456,751. Generally, first cellulose is reacted with an aqueous alkali hydroxide. The alkali cellulose may be reacted with one or more etherifying agents. Useful etherifying agents are for example alkyl halides, such as methyl chloride or ethyl chloride, alkylene oxides, such as ethylene oxide, propylene oxide or butylene oxide, or dialkyl sulfates, such as dimethyl sulfate or diethyl sulfate.

The cellulose ether is dissolved in a liquid diluent before it is added to the aqueous composition containing an emulsified liquid resin. By "liquid diluent" is meant a diluent which is liquid at ambient pressure and ambient or slightly elevated temperature, i.e. up to 50° C. Useful diluents are for example polar organic solvents which have an $E_T$ value of more than 38 kcal/mol, preferably more than 40 kcal/mol, and up to 60 kcal/mol, such as N-methyl-pyrrolidone, alcohols, such as methanol, ethanol or isopropanol, glycols, such as propylene glycol, ethylene glycol or butylene glycol, glycol mono- or diethers, such as the methyl or isopropyl mono- or diethers of said glycols, or chlorinated solvents, such as methylene chloride. The $E_T$ value is defined at 25° C., as indicated in "Lösungsmitteleffekte in der organischen Chemie", Reihe chemische Taschenbücher, Verlag Chemie 1973, p. 162 and 163. An aqueous solution is preferred. By aqueous solution is meant that the majority of the liquid consists of water molecules. In addition to water, the aqueous solution may contain minor amounts of inert organic solvents which are miscible with water, such as those listed above. Preferably, the amount of such an organic solvent is less that 50%, more preferably less than 20% and most preferably less than 10%, based on the total amount of water and organic solvent. Furthermore, the solution of the cellulose ether may contain organic compounds which originate from the process of producing the cellulose ether. Such compounds are for example methanol or ethanol, ethers, such as dimethyl ether or diethyl ether, or glycols. The solution preferably contains from 100 to 50,000 mg, more preferably from 200 to 25,000 mg and most preferably from 300 to 15,000 mg of the cellulose ether per liter of solution.

For producing the solution, cellulose ether which is produced in a known manner can be dried and ground and the solid cellulose ether can be used to prepare a solution described above. Alternatively, wastewater which originates from a process of producing a non-ionic cellulose ether can be directly used in the process of the present invention. This embodiment of the present invention is highly advantageous. Wastewater originating from the production of a non-ionic cellulose ether typically contains residual amounts of cellulose ether. This wastewater has to be pretreated prior to release to the environment in order to decrease its chemical oxygen demand (COD). A typical pretreatment method is biodegradation. Unfortunately, non-ionic cellulose ethers generally are slowly biodegradable. Other pretreatment methods are the precipitation of the dissolved non-ionic cellulose ether by adding phenolic compounds to the wastewater, as suggested by Japanese patent 57068190, or heating of the wastewater in the presence of an inorganic salt, coagulation and filtering the cellulose ether, as suggested by published Russian patent application SU 874660. By blending a wastewater stream originating from the production of liquid resin and a wastewater stream originating from the production of non-ionic cellulose ether, the concentration of the liquid epoxy resin and of the non-ionic cellulose ether can be reduced by the same process. Usually at least 30%, typically at least 50% and in many cases even at least 70% of the total weight of the non-ionic cellulose ether contained in a wastewater stream originating from the production of non-ionic cellulose ether can be reduced by mixing the above-mentioned wastewater streams.

The solution of the non-ionic cellulose ether in a liquid diluent optionally contains one or more ionic compounds. When a wastewater stream originating from the cellulose ether production is used as an aqueous solution, the aqueous solution generally contains ionic compounds. The types and amounts of ionic compounds which may be contained in the aqueous solution are typically those indicated above, such as sodium chloride, sodium hydroxide or sodium carbonate.

The optimal amount of the cellulose ether that is added to the aqueous composition depends upon various parameters, such as the type and concentration of the liquid resin and ionic compound in the aqueous composition and the type and the solubility of the cellulose ether in the aqueous composition. Preferably from 50 to 10,000 mg, more preferably from 500 to 7,500 mg, most preferably from 1000 to 5,000 mg of cellulose ether is added per liter of the aqueous composition. If different types of cellulose ethers are added, the total amount of the cellulose ethers preferably is within the stated ranges. Generally the cellulose ether is added to the aqueous composition at such an amount that the weight ratio cellulose ether:liquid resin is at least 1:1, preferably from 1.1:1 to 20:1, more preferably from 1.3:1 to 12:1, most preferably from 1.5:1 to 8:1.

Advantageously, the solution of cellulose ether is rapidly and homogeneously mixed with the aqueous composition, for example by thorough stirring of the composition during and after the addition of the solution. Before, during or, preferably, after the addition of the solution of cellulose ether, the aqueous composition can be heated in order to facilitate the formation of agglomerates. Preferably, the mixture of the aqueous composition and of the cellulose ether solution is heated to a temperature of from 30° to 100° C., more preferably of from 50° to 95° C., most preferably of from 60° to 90° C. Heating during a time period of from 1 to 30 minutes, preferably from 1 to 15 minutes is generally sufficient. Advantageously, the blend of the aqueous composition containing liquid resin and the solution containing cellulose ether is stirred during the heating. An agglomerate of precipitated cellulose ether and liquid resin is formed. Without wanting to be bound to the theory, it is believed that the cellulose ether encapsulates the resin droplets in the aqueous composition and an agglomerate of cellulose ether/liquid resin in the form of flocks is formed. Based on inspections by microscope, it is believed that the emulsified resin droplets are surrounded by cellulose ether in the agglomerate of cellulose ether/liquid resin. The composition of this agglomerate can be determined by known methods, such as IR-, $^1$H-NMR or $^{13}$C-NMR-spectroscopy. It has been found to be essential that the cellulose ether is added to the aqueous composition in the form of a solution and not in its solid form. If solid non-ionic cellulose ether is added to the aqueous composition, no substantial encapsulation of the resin droplets by the cellulose ether could be observed by microscope inspection.

The agglomerate of cellulose ether and liquid resin can be separated from the liquid phase of the mixture of aqueous composition and cellulose ether solution in a conventional manner, for example by decantation, sedimentation or centrifugation methods. Preferably, the agglomerate is separated from the liquid phase while the aqueous composition still has a temperature of from 30° to 100° C., more preferably of from 50° to 95° C., most preferably of from 60° to 90° C. Alternatively, the agglomerate may be separated from the liquid phase after the aqueous composition has been cooled or has been left to cool to ambient temperature. However, cooling is not recommended if more cellulose ether has been added to the aqueous composition than is necessary to co-precipitate the amount of liquid resin present. Although the agglomerate of cellulose ether and liquid resin generally does not redissolve upon cooling or dilution, excess cellulose ether may redissolve upon cooling.

The method of the present invention very efficiently reduces the concentration of liquid resin in the aqueous composition. The concentration of the liquid resin in the aqueous phase after the separation of the agglomerate depends on various factors, such as the initial concentration and type of the liquid resin, the concentration of the cellulose ether and of the ionic compound etc. Generally, the concentration of the liquid resin in the aqueous phase of the composition after the separation of the cellulose ether/resin agglomerate is only up to 20%, typically only up to 10%, in many cases even only up to 5%, based on the concentration of the liquid resin in the aqueous composition before carrying out the method of the present invention.

The method of the present invention is particularly useful for reducing the concentration of a liquid epoxy resin in an aqueous composition which is a waste effluent from an epoxy resin production plant. The waste effluent from an epoxy resin production plant typically not only contains emulsified liquid epoxy resin but also ionic inorganic compounds, such as sodium chloride, sodium carbonate and sodium hydroxide in high concentrations, frequently up to the saturation point. It has been found that the method of the present invention works well on the industrial or pilot industrial scale.

The method of the present invention is illustrated by the following examples which should not be construed to limit the scope of the invention. Unless otherwise mentioned, all parts and percentages are by weight.

EXAMPLES

Example 1

A 250 ml jacketed glass reactor is heated to 55° C. The reactor is equipped with an agitator, condenser and thermometer. 100 ml of an aqueous stream from the production of liquid diglycidyl ether of Bisphenol A containing about 100 ppm of the emulsified resin, 20% of sodium chloride, 9% of sodium carbonate and 1% of sodium hydroxide, is added to the reactor and agitated at 400 rpm. To the stirred mixture 100 ml of an aqueous stream from the production of methyl hydroxypropyl cellulose ether (MHPC), containing about 1600 ppm of dissolved MHPC is added. The mixture is stirred until the temperature has reached 50° C. and precipitation of flocks has taken place. The mixture is then drawn off and the precipitate removed by centrifugation.

By HPLC (high pressure liquid chromatography) analysis of the supernatant no liquid epoxy resins could be detected. The concentration of the cellulose ether material was found to be reduced by 70%, based on the original weight of cellulose ether material added.

Example 2

Example 1 is repeated, however 100 ml of an aqueous stream from the production of liquid diglycidyl ether of Bisphenol A is artificially enriched with diglycidyl ether of Bisphenol A up to a concentration of 298 ppm by means of a high speed shear mixer at 10,000 rpm.

In the supernatant 3 ppm of the resin could be detected which is equal to a reduction by 98%.

Example 3

Example 1 is repeated, however 100 ml of an aqueous stream from the production of liquid diglycidyl ether of Bisphenol A is artificially enriched with diglycidyl ether of Bisphenol A up to a concentration of 1939 ppm by means of a high speed shear mixer at 10,000 rpm.

In the supernatant 95 ppm of the resin could be detected which is equal to a reduction by 90%.

Example 4

3.72 mt of an aqueous stream deriving from the production of liquid diglycidyl ether of Bisphenol A containing 100 ppm of the emulsified resin, are mixed with 2.04 mt of an aqueous stream of the MHPC production, containing 13,500 ppm of dissolved MHPC, and heated to 70° C. The mixture is centrifuged to remove the solid precipitate.

In the supernatant no resin could be detected, the MHPC concentration was found to be reduced by 81%, the total organic carbon (TOC) and chemical oxygen demand (COD) (TOC according to DIN 38409 H 3, COD according to DIN 38409 H 41) data were measured and are listed in Table 1.

TABLE 1

|  | Mixed Stream | % TOC Reduction | % COD Reduction |
| --- | --- | --- | --- |
| ppm TOC before treatment | 13800 | | |
| ppm TOC after treatment | 9600 | 32 | |
| ppm COD before treatment | 38370 | | |
| ppm COD after treatment | 26800 | | 32 |

Example 5

Example 1 is repeated, however to the stirred mixture 100 ml of a 0.5% aqueous solution of methyl hydroxypropyl cellulose ether (MHPC) is added. The MHPC has a methyoxyl substitution of 25.3%, a hydroxypropyl substitution of 26.4% and a weight average molecular weight (Mw) of 320,000. The mixture is then drawn off and the precipitate removed by centrifugation.

By HPLC analysis of the supernatant no liquid epoxy resins could be detected. The concentration of the MHPC was found to be reduced by 76%.

What is claimed is:

1. A method of reducing the concentration of a liquid resin in an aqueous composition containing an emulsified liquid resin and at least one ionic compound, which method comprises contacting the aqueous composition with a solution of a non-ionic cellulose ether in a liquid diluent to produce an agglomerate of the cellulose ether and the liquid resin.

2. The method of claim 1 wherein the emulsified liquid resin is an epoxy resin.

3. The method of claim 1 wherein the cellulose ether is a $C_{1-2}$-alkyl cellulose ether or a $C_{1-2}$-alkyl hydroxy-$C_{2-4}$-alkyl cellulose ether.

4. The method of claim 2 wherein the cellulose ether is a $C_{1-2}$-alkyl cellulose ether or a $C_{1-2}$-alkyl hydroxy-$C_{2-4}$-alkyl cellulose ether.

5. The method of claim 1, wherein the cellulose ether is a methyl cellulose ether having a methoxyl substitution of from 24 to 37%.

6. The method of claim 1, wherein the cellulose ether is a hydroxypropyl methyl cellulose ether having a methoxyl substitution of from 10 to 37% and a hydroxypropyl substitution of from 0.3 to 37%.

7. The method of claim 2 wherein the cellulose ether is a hydroxypropyl methyl cellulose ether having a methoxyl substitution of from 10 to 37% and a hydroxypropyl substitution of from 0.3 to 37%.

8. The method of claim 1 wherein the aqueous composition contains said at least one ionic compound at an amount of at least 50%, based on the saturation concentration of all the ionic compounds in the aqueous composition at 20° C.

9. The method of claim 2 wherein the aqueous composition contains said at least one ionic compound at an amount of at least 50%, based on the saturation concentration of all the ionic compounds in the aqueous composition at 20° C.

10. The method of claim 7 wherein the aqueous composition contains said at least one ionic compound at an amount of at least 50%, based on the saturation concentration of all the ionic compounds in the aqueous composition at 20° C.

11. The method of claim 1 wherein the aqueous composition and the cellulose ether are contacted at a temperature of from 30° to 100° C.

12. The method of claim 2 wherein the aqueous composition and the cellulose ether are contacted at a temperature of from 30° to 100° C.

13. The method of claim 10 wherein the aqueous composition and the cellulose ether are contacted at a temperature of from 30° to 100° C.

14. The method of claim 1 wherein the aqueous composition contains an initial concentration of the liquid resin of from 10 to 8,000 ppm, based on the total weight of the aqueous composition.

15. The method of claim 2 wherein the aqueous composition contains an initial concentration of the liquid resin of from 10 to 8,000 ppm, based on the total weight of the aqueous composition.

16. The method of claim 13 wherein the aqueous composition contains an initial concentration of the liquid resin of from 10 to 8,000 ppm, based on the total weight of the aqueous composition.

17. The method of claim 1 wherein the amount of cellulose ether is such that the weight ratio of cellulose ether:liquid resin is from 1.1:1 to 20:1.

18. The method of claim 2 wherein the amount of cellulose ether is such that the weight ratio of cellulose ether:liquid resin is from 1.1:1 to 20:1.

19. The method of claim 16 wherein the amount of cellulose ether is such that the weight ratio of cellulose ether:liquid resin is from 1.1:1 to 20:1.

20. The method of claim 1 wherein agglomerate of cellulose ether and liquid resin is removed from the mixture of aqueous composition and cellulose ether solution.

* * * * *